UNITED STATES PATENT OFFICE.

ALBRECHT SCHMIDT, OF HÖCHST-ON-THE-MAIN, GERMANY, ASSIGNOR TO FARBWERKE VORM. MEISTER LUCIUS & BRUNING, OF HÖCHST-ON-THE-MAIN, GERMANY, A CORPORATION OF GERMANY.

GREEN-BLACK VAT-DYE.

No. 872,086.  Specification of Letters Patent.  Patented Nov. 26, 1907.

Application filed July 24, 1907. Serial No. 385,312.

*To all whom it may concern:*

Be it known that I, ALBRECHT SCHMIDT, Ph. D., chemist, a citizen of the Empire of Germany, and residing at Höchst-on-the-Main, Germany, have invented certain new and useful Improvements in Making a New Greenish-Black Vat-Dyestuff, of which the following is a specification.

I have found a new greenish black vat dyestuff having the formula:

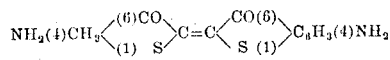

being a black powder, insoluble in water, alkalihydrates, dilute acids, alcohol, ether, benzene, soluble in concentrated sulfuric acid with a greenish dark blue color, yielding with alkaline hydrosulfite solution a yellowish-greenish vat from which wool and cotton are dyed greenish black tints. This vat dyestuff may be obtained, for instance, by heating para-amidophenylthioglycollic-orthocarboxylic acid of the type

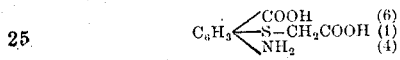

or its acidyl derivatives, for instance,

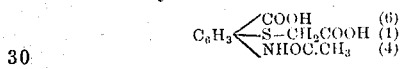

with alkalihydrates and by oxidizing the leuco bodies isolated from the melt, para-amidoöxythionaphthene carboxylic acid or para-amidoöxythionaphthene.

The parent material, for instance, the para-acetylamidophenylthioglycollic - ortho - carboxylic acid

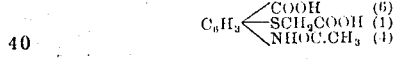

may be obtained as follows: 110 gr. of acetaminoanthranilic acid

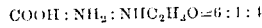

are dissolved in 50 gr. of sodium hydrate and water. After adding 150 c.c. of concentrated hydrochloric acid and ice the solution is diazotized with 35 gr. of sodium nitrite. This diazo solution is allowed to run at about 70—75° C. into an aqueous solution of 100 gr. of potassium xanthogenate and 200 gr. of sodium carbonate; the filtered solution is treated with 75 gr. of chloracetic acid, dissolved in about 90 gr. of caustic soda and water and heated to ebullition for some hours. After filtration the solution is precipitated with dilute hydrochloric acid, when the acetamidophenylthioglycollic-orthocarboxylic acid is precipitated as a brownish powder. The melt is obtained, for instance, as follows: 30 parts of this acid are introduced at about 100° C. in 180 parts of caustic soda liquefied with about 30 parts or more of water. The temperature is gradually raised while stirring to about 170°—190° C., till the melt becomes brittle.

The operation may also occur by heating with less alkali or under pressure. The product of condensation may be isolated in various ways: Thus, for instance, the stirring may occur with little water and the sodium salt of para-amidoöxythionaphthene-carboxylic acid thus separated and soluble with difficulty in alkalihydrate, readily soluble in water, is filtered from the excess of the alkali-hydrate solution.

The product of condensation of para-amido-oxythionaphthene-carboxylic acid may also be obtained from the aqueous solution of the strongly cooled melt by directly acidifying with acetic acid, when it is precipitated as a crystalline powder. It is soluble in an excess of hydrochloric acid in the heat, as well as in a solution of sodium carbonate; on boiling, carbonic acid is evolved, and the liquid solidifies to a magna of quinone-yellow needles of para-amidoöxythionaphthene. It is soluble in ether with a strong yellow-greenish fluorescence and is colorless in soda-lye and mineral acids.

The oxidation of the afore-described leuco bodies may be carried out in the following manner: 30 parts by weight of the above mentioned carboxylic acid or of para-amido-oxythionaphthene are dissolved in the heat with 30 parts of soda-lye and 200 parts of water, the solution being then treated with air at about 70—80° C. till no further amido-oxythionaphthene carboxylic acid or amido-oxythionaphthene can be traced in the filtrate. The operation may also occur by oxidizing in a neutral or alkalicarbonate-alkaline suspension instead of in a much diluted caustic alkali solution or even by directly using for the oxidation the sodium salt of para-amino-oxythionaphthene carboxylic acid obtained by treating the melt with limited quantities of water. The oxidation may also occur with ferric salts, potassium ferri-cyanid and the like in neutral or feebly alkaline solution.

The dyestuff separated in greenish black flakes by one or the other method is isolated from the mother-lye by filtration and may be purified from small inter-mixtures by boiling with alcohol. When dry, it is a black powder, insoluble in water, alkalihydrates, dilute acids, alcohol, ether, benzene, soluble in concentrated sulfuric acid with a greenish dark blue color, yielding with alkaline hydrosulfite solution a yellowish greenish vat from which wool and cotton are dyed greenish black tints.

Having now described my invention, what I claim is:

As product, the greenish black vat dyestuff having the formula:

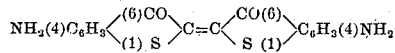

being insoluble in water, alkalihydrates, dilute acids, alcohol, ether, benzene, soluble in concentrated sulfuric acid with a greenish dark blue color, yielding with alkaline hydrosulfite solution a yellowish-greenish vat from which wool and cotton are dyed greenish-black tints.

In testimony, that I claim the foregoing as my invention, I have signed my name in presence of two subscribing witnesses.

ALBRECHT SCHMIDT.

Witnesses:
JEAN GRUND,
CARL GRUND.